(12) United States Patent
Ploof

(10) Patent No.: US 8,739,997 B1
(45) Date of Patent: Jun. 3, 2014

(54) ELECTRICAL BOX WITH SAFETY DOOR

(71) Applicant: Scott A. Ploof, Jacksonville, FL (US)

(72) Inventor: Scott A. Ploof, Jacksonville, FL (US)

(*) Notice: Subject to any disclaimer, the term of this patent is extended or adjusted under 35 U.S.C. 154(b) by 0 days.

(21) Appl. No.: 13/794,892

(22) Filed: Mar. 12, 2013

(51) Int. Cl.
H02G 3/08 (2006.01)
H02G 3/00 (2006.01)
H02G 3/14 (2006.01)
H02G 3/12 (2006.01)
H01H 19/06 (2006.01)
H05K 5/03 (2006.01)

(52) U.S. Cl.
CPC .. *H02G 3/00* (2013.01); *H02G 3/14* (2013.01); *H02G 3/123* (2013.01); *H01H 19/06* (2013.01); *H05K 5/03* (2013.01)
USPC ............. 220/3.8; 220/3.2; 220/835; 439/133; 174/50; 174/58; 174/66; 174/67; 16/282; 16/287; 16/367

(58) Field of Classification Search
CPC ............. H02G 3/00; H02G 3/08; H02G 3/14; H02G 3/132; H01H 16/06; H05K 5/03
USPC ......... 220/3.2, 3.8, 835; 439/133; 174/50, 58, 174/66, 67; 16/282, 287, 367
See application file for complete search history.

(56) References Cited

U.S. PATENT DOCUMENTS

| | | | |
|---|---|---|---|
| 2,987,909 A * | 6/1961 | Shlank | 70/168 |
| 4,197,959 A | 4/1980 | Kramer | |
| 4,483,453 A | 11/1984 | Smolik | |
| 4,640,564 A * | 2/1987 | Hill | 439/137 |
| 5,180,886 A | 1/1993 | Dierenbach et al. | |
| 5,240,426 A | 8/1993 | Barla | |
| 5,456,373 A | 10/1995 | Ford | |
| 5,965,846 A | 10/1999 | Shotéy et al. | |
| 6,179,634 B1 | 1/2001 | Hull et al. | |
| 6,737,576 B1 | 5/2004 | Dinh | |
| 6,986,674 B1 | 1/2006 | Gorman | |
| 7,410,372 B2 | 8/2008 | Johnson et al. | |
| 7,462,777 B2 | 12/2008 | Dinh | |
| 7,763,799 B2 | 7/2010 | Johnson | |
| 8,231,022 B2 * | 7/2012 | Goldenne et al. | 220/3.8 |
| 2003/0089710 A1 * | 5/2003 | Gates, II | 220/3.92 |

* cited by examiner

Primary Examiner — Fenn Mathew
Assistant Examiner — Elizabeth Volz
(74) Attorney, Agent, or Firm — Robert C. Montgomery; Montgomery Patent & Design

(57) ABSTRACT

An apparatus providing an enclosure being recessed within a wall structure and containing a plurality of electrical outlets includes a locking access door to cover the electrical outlets. The apparatus mounts flush to wall surface. The door slides upwardly to access the electrical outlets and can be locked in a lowered position using a locking mechanism and includes at least one cord slot to allow cords to be outwardly routed.

19 Claims, 4 Drawing Sheets

ELECTRICAL BOX WITH SAFETY DOOR

RELATED APPLICATIONS

Not applicable.

FIELD OF THE INVENTION

The present invention relates generally to electrical outlet assemblies, and in particular, to an electrical box having a safety door for mounting electrical outlets within a wall structure in a recessed manner.

BACKGROUND OF THE INVENTION

Among the many dangers present in any home, the risk of injury or death caused by accidents involving electricity and electrical devices is among the most common. The most common way of protecting children against accidental contact with electrical receptacles is by the use of childproof plastic covers. However, these covers must be removed when an electrical device is plugged in. In this configuration, even the youngest child can remove the plug by simply pulling on the cord. Thus, the electrical outlet becomes exposed, or perhaps, even more dangerously, the energized plug could become exposed should the plug not become fully disengaged. Splashing by water in garage, bathroom and kitchen areas also remains a concern. Additionally, the location and spacing of electrical outlets is governed by codes and regulations, but their aesthetic appearance often leaves much to be desired in certain locations.

Despite any advances already in the field, those skilled in the art continue with research and development efforts directed to the safety, security, and appearance of electrical outlets that can be modified to address the aforementioned safety concerns.

SUMMARY OF THE INVENTION

The inventor has recognized the aforementioned inherent problems and lack in the art and observed that there is a need for an apparatus that allows for power cord retention, physical protection, and safety access, along with increased aesthetic qualities for the common AC electrical outlets. The development of the present invention, which will be described in greater detail herein, substantially departs from conventional solutions to provide an electrical box with safety door and in doing so fulfills this need.

The disclosed electrical box can include an enclosure having sidewalls forming a front opening, wherein the sidewalls are configured to mount at least one electrical outlet, a front frame extending perpendicularly outward from a perimeter edge of the sidewalls, a plurality of frame clasps mechanically connected to the front frame and configured to secure the enclosure to a wall surface, and a door slidably connected to the enclosure behind the front frame, wherein the door is movable between and open and closed position to cover the front opening.

In another embodiment, the disclosed electrical box can include an enclosure configured to be recessed within an opening in a wall surface and having a rear wall, an upper wall, a lower wall, and lateral sidewalls forming a front opening, wherein the rear wall and said sidewalls are configured to mount a plurality of electrical outlets, a front frame extending perpendicularly outward from a perimeter edge of the sidewalls to contact an exterior of the wall surface, a door slot disposed through the upper sidewall, a plurality of frame clasps configured to secure the enclosure to an edge of the opening in the wall surface, wherein one of the plurality of frame clasps is mechanically connected to each corner of the front frame, and a door extending between the sidewalls and slidably connected within the door slot, wherein the door is movable between and open and closed position to cover the front opening.

In another embodiment, the disclosed electrical box can include a door having at least one cord slot disposed about a lower edge and being configured to permit a power cord to extend through when the door is in the closed position.

In another embodiment, the disclosed electrical box can include a door having a locking mechanism including a key actuated lock and a latch extending from the lock, wherein the latch is movable between an engaged position to lock the door in the closed position and disengaged position.

In another embodiment, the disclosed electrical box can include sidewalls and a rear wall each having a knock-out section defined by a plurality of intersecting perforations, wherein the knock-out sections are removable about the perforations to form openings and wherein the openings are configured to receive one of the plurality of electrical outlets.

In another embodiment, the disclosed electrical box can include sidewalls and a rear wall each having a generally rectangular opening configured to receive one of the plurality of electrical outlets.

In another embodiment, the disclosed electrical box can include a plurality of frame clasps having a tab spaced away from the front frame and threadably attached by a threaded fastener, wherein rotation of the threaded fastener extends and retracts the tab relative to the front frame.

In another embodiment, the disclosed electrical box can include a tab having a first end threadably attached to the threaded fastener, a second end opposite the first end, and a flat surface extending from the first end to the second end to contact an interior of the wall surface.

Furthermore, the described features and advantages of the disclosed baluster bracket assembly may be combined in various manners and embodiments as one skilled in the relevant art will recognize after reading the present disclosure. The disclosure can be practiced without one or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
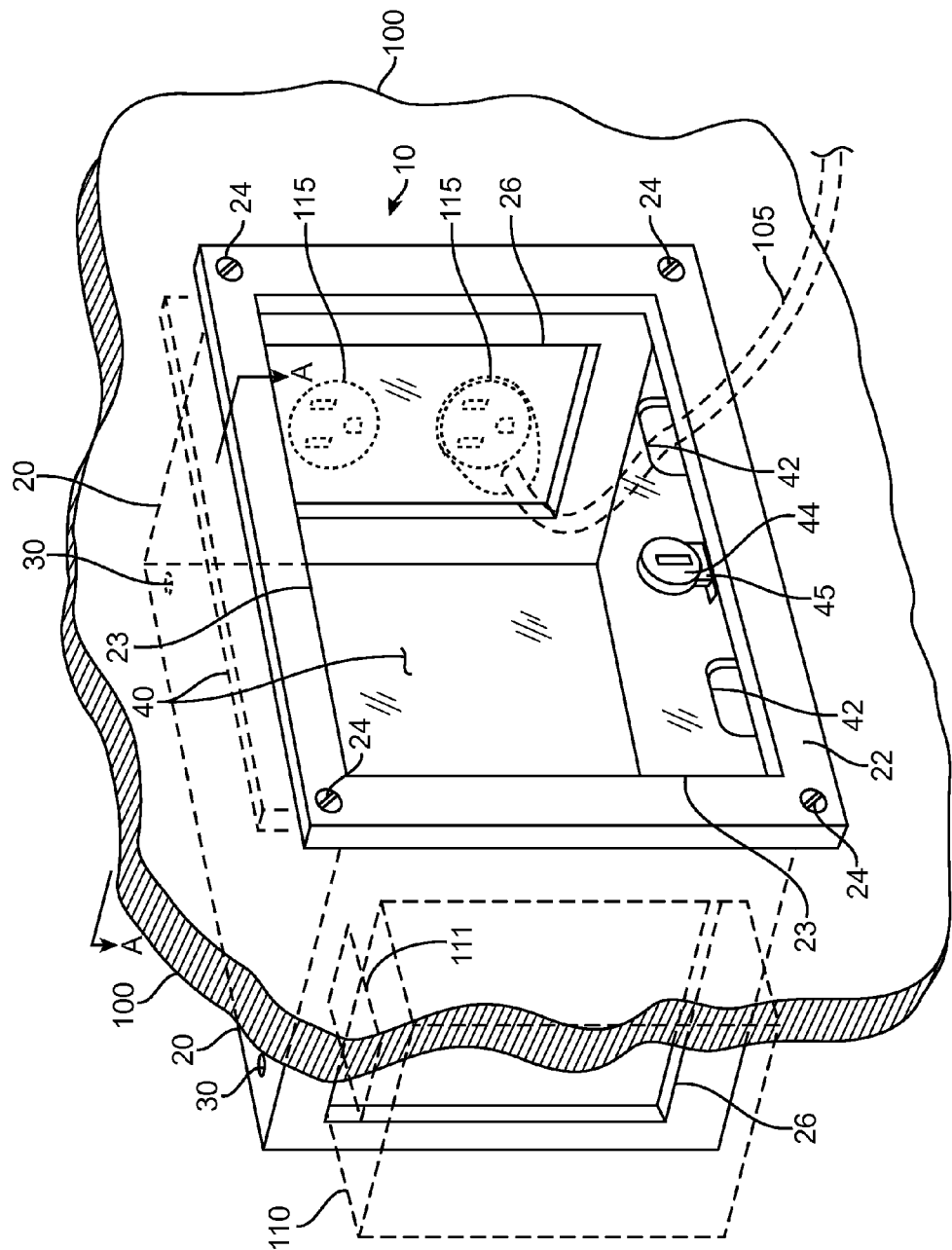
FIG. 1 is an environmental view of a disclosed electrical box with safety door depicted as installed within a wall structure.

110 electrical box with safety door
120 enclosure 22 front frame
23 front opening
24 frame clamp
26 electrical box aperture
27 perforation
30 mounting aperture
40 safety door
42 cord slot
44 lock
45 latch
46 safety door slot
48 latch aperture
50 key
100 wall structure
105 cord
110 electrical box
111 clip feature
115 outlet
120 cover plate
125 wiring

DETAILED DESCRIPTION OF THE PREFERRED EMBODIMENT

In accordance with the invention, the best mode is presented in terms of described embodiments, herein depicted within FIGS. 1 through 4. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 4, disclosing an electrical box with safety door (herein generally described as an "apparatus") 10, where like reference numerals represent similar or like parts. In accordance with the invention, the present disclosure describes an apparatus 10 which provides for an electrical outlet 115 to be located in a recessed manner within a wall structure 100 and also to be accessed through a locking safety door 40 that shields the electrical outlet 115 for safety, security, and aesthetic reasons.

For example, a plurality of conventional 120VAC, NEMA 5-15R receptacle or other electrical outlets 115 can be mounted within the apparatus 10 in a perpendicular configuration relative to the surface of the wall structure 100. A front opening 23 of the apparatus 10 can be covered with a safety door 40 which may be slid upwardly to access the outlets 115 or may be locked in a lowered position to protect children from a possible electrical safety hazard. The safety door 40 can include a pair of small "U"-shaped openings to allow power cords 105 to be routed from the electrical outlet 115 to nearby appliances, light fixtures, or the like.

Referring first to FIG. 1, the apparatus 10 can include a generally rectangular enclosure 20 made of plastic using an injection molding process and having an integral flanged front frame 22 extending outwardly from a front opening 23 of the enclosure 20 in a perpendicular manner. The enclosure 20 can include a plurality of electrical box apertures 26 along side and rear surfaces having "knock-out" sections defined by a plurality of perforations 27 (FIGS. 2 and 4) arranged in a rectangular pattern and allowing selective removal to provide insertion of an electrical box 110 through the apertures 26. The total number of outlets 115 that can be installed within the apparatus 10 can vary, for example only two installed outlets 115 shown if FIG. 1.

Each electrical box aperture 26 can include a generally rectangular perimeter shape suitably sized to receive various standard electrical boxes 110. The electrical boxes can be attached to wall portions of the apparatus 10, for example by using boxes 110 having integral mounting clip features 111. It can be appreciated by one skilled in the art that other styles of electrical boxes 110 utilizing other attachment or fastening mechanisms, such as threaded fasteners, clips, clamps, or the like, can also be used with equal benefit and the embodiment shown is not meant to limit the present disclosure. It can be further appreciated that the apparatus 10 may utilize various other electrical devices instead of, or in combination with the outlets 115, such as, but not limited to: GFCI-type outlets, light switches, dimmers, and the like, which utilize electrical boxes 110 in like manner, thereby providing the intended safety and security benefit. The outlets 115, or other electrical devices, installed in the apparatus 10 are envisioned to utilize standard corresponding cover plates 120 to enclose exposed wiring 125 in a conventional manner.

Figure 2:
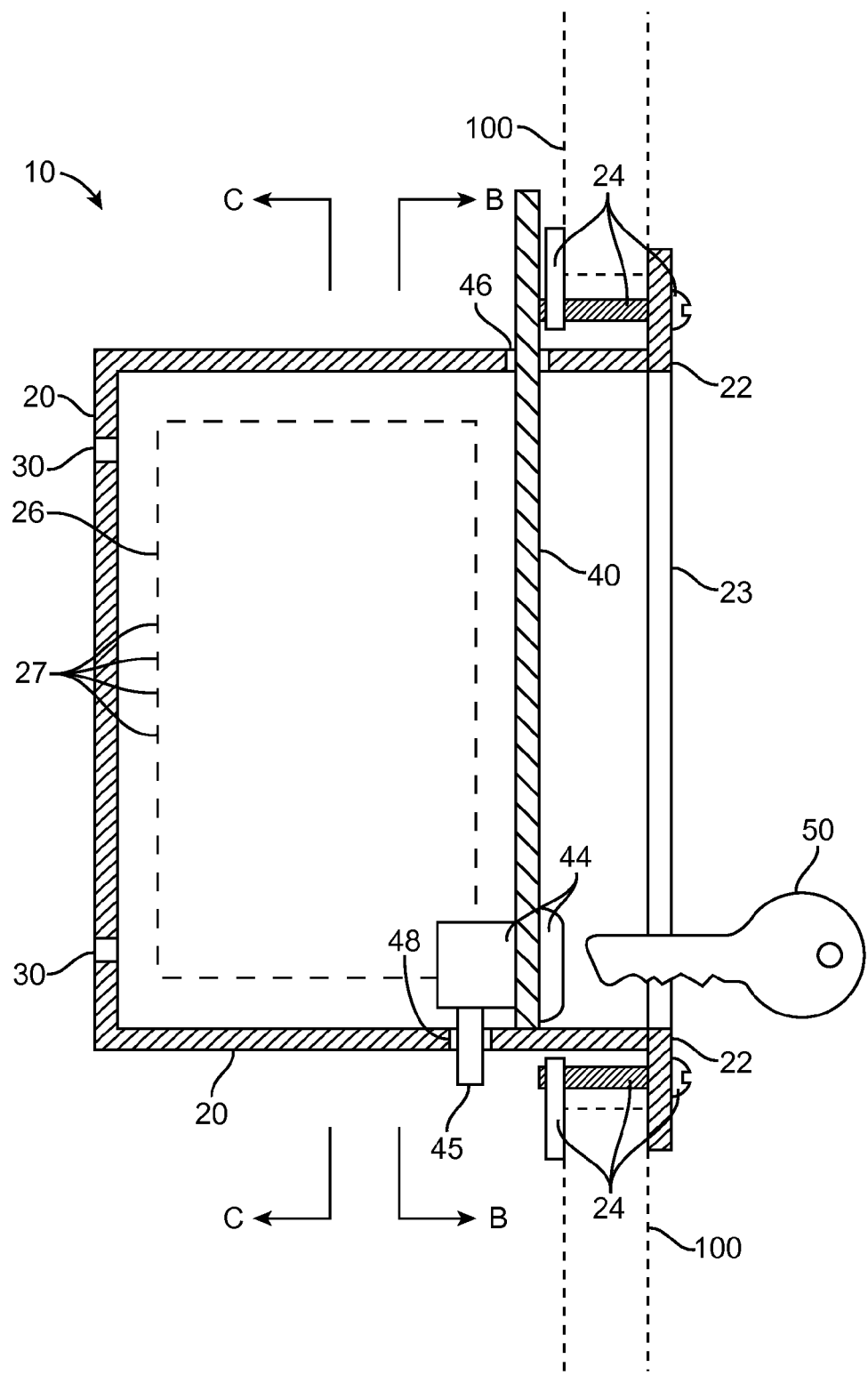
FIG. 2 is a section view of the electrical box with safety door taken along section line A-A of FIG. 1.
Figure 3:
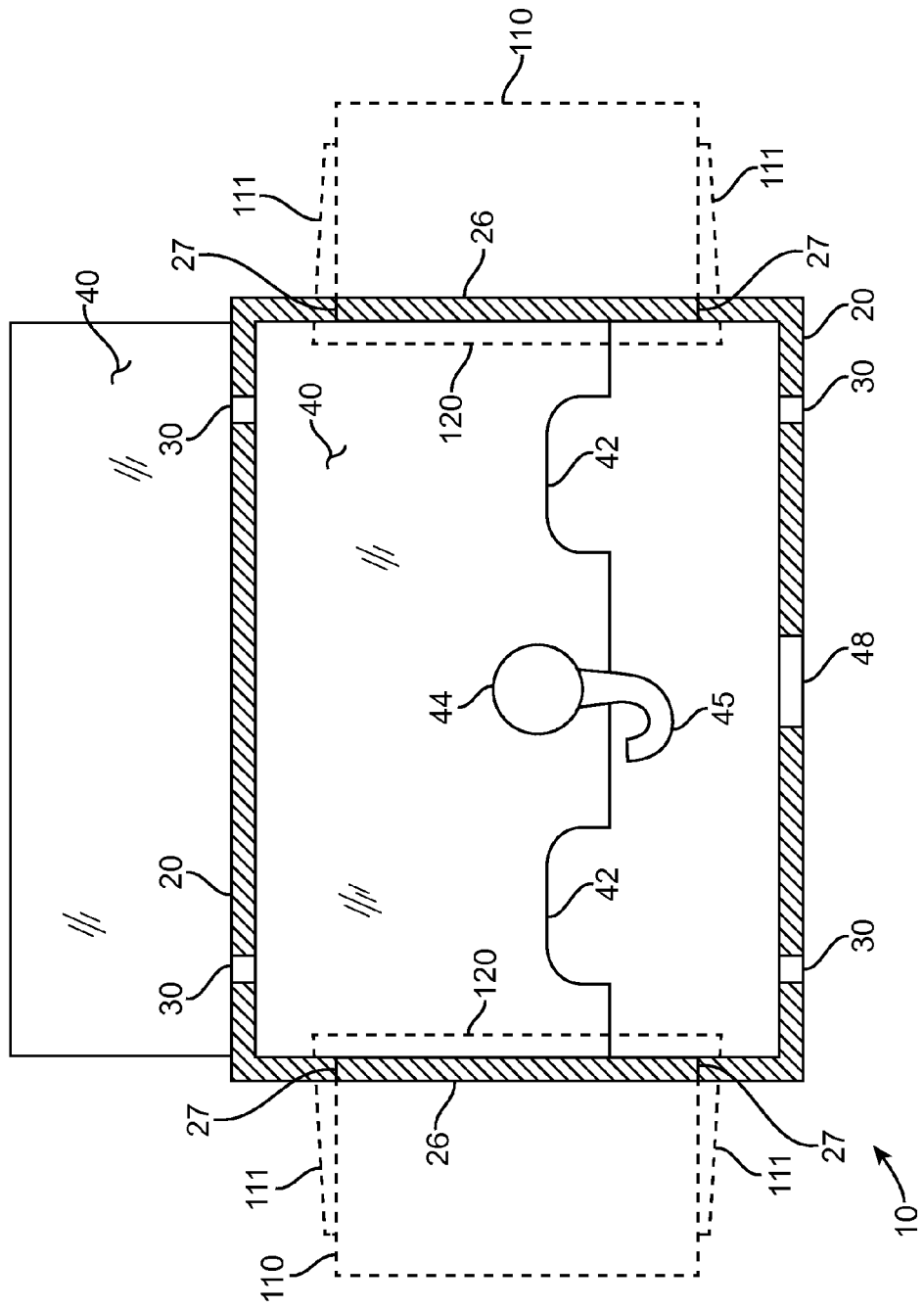
FIG. 3 is a section view of the electrical box with safety door taken along section line B-B of FIG. 2; and, FIG. 4 is a section view of the electrical box with safety door taken along section line C-C of FIG. 2.
Figure 4:
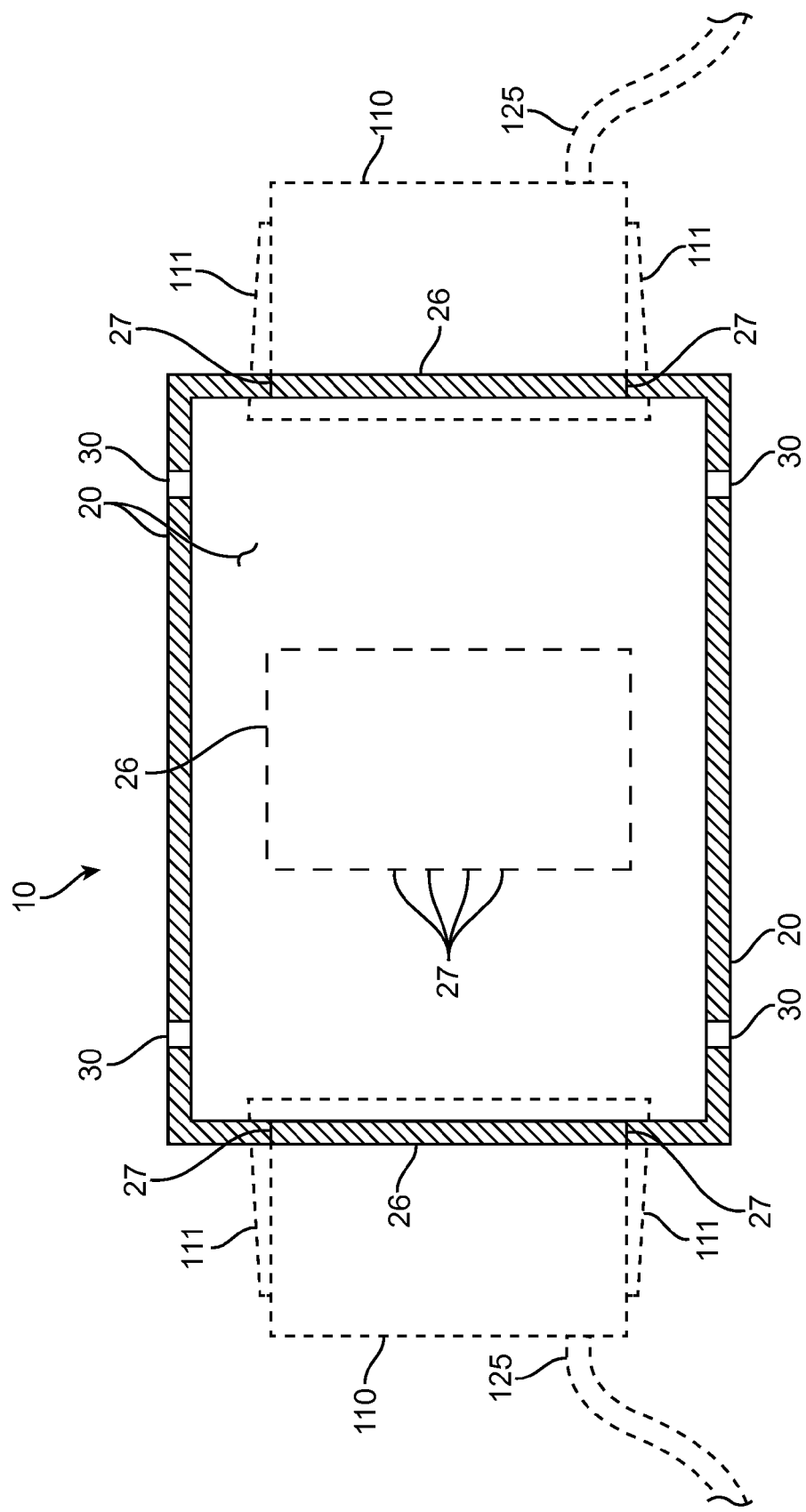

The enclosure 20 can be attached to the wall structure 100 by a plurality of frame clamps 24, a plurality of mounting apertures 30, or a combination of both clamps 24 and apertures 30 (FIGS. 2, 3, and 4). The apparatus 10 can be incorporated into new home construction applications or can be installed into an existing wall structure 100 by cutting an appropriately-sized opening in the wall structure 100 into which the enclosure 20 can be inserted and secured.

The apparatus 10 can include a vertically sliding safety door 40 which provides safe and secure access to an inner space of the enclosure 20. The safety door 40 can be motioned vertically through a safety door slot 46 and can be locked in a lowered and closed state using a rotary latching key-lock mechanism 44 (see FIGS. 2 and 3). The safety door 40 can be made of extruded plastic having a pair of small "U"-shaped openings to allow cords 105 to be routed from inner space of the enclosure 20 to power to appliances, light fixtures, and the like. The safety door 40 and the adjacent front frame 22 can be molded of transparent plastic, painted, or wallpapered to match the surrounding surface of the wall structure 100 based upon a user's preference.

Referring next to FIGS. 2, 3, and 4, the four (4) frame clamps 24 and the plurality of mounting apertures 30 can provide a means to attach the apparatus 10 to the wall structure 100. The frame clamps 24 can be located at front corner positions along the front frame 22 and include threaded clamping mechanisms that contact an inner surface of the wall structure 100 and compress the front frame 22 against an outer surface of the wall structure 100 when tightened by fastener portions of the frame clamps 24. The mounting apertures 30 can be molded into top, bottom, and side surfaces of the enclosure 20 to provide for conventional fastener-mounting of the enclosure 20 to adjacent studs or framing members within the wall 100 using suitable fasteners, such as nails, screws, or the like.

The key lock 44 can be any commercially available panel-mount cabinet component having a key 50 and a pivoting latch 45 which can protrudes downwardly through and hook a subjacent latch aperture 48 disposed in a bottom wall of the enclosure 20 (FIGS. 2 and 3).

In accordance with the described embodiments, the apparatus 10 can be installed and utilized by the user in a simple and effortless manner with little or no training. It is envisioned that the apparatus 10 can be constructed in general accordance with FIGS. 1 through 4. After initial purchase or acquisition of the apparatus 10, it can be installed as indicated in FIG. 1.

The method of installing the apparatus 10 can be achieved by performing the following steps: determining a suitable location along a new or existing wall structure 100 to install the apparatus 10; cutting an opening into a portion of the wall structure 100; pressing out a desired number of electrical box apertures 26 upon wall portions of the enclosure 20 about the perforations 27; pre-installing the electrical boxes 110 about the electrical box apertures 26 using clip features 111; connecting electrical wiring 125 to the outlets 115; installing the outlets 115 and cover plates 120 to the electrical boxes 110; inserting the enclosure 20 through the opening in the wall structure 100 until the front frame 22 is flush with an outer surface of the wall structure 100; tightening the four (4) frame clamps 24 using integral fastener portions; and optionally driving additional mounting fasteners, such as nails or screws, through the mounting apertures 30 and subsequently into adjacent interior members of the wall structure 100 to securely mount the apparatus 10.

The method of utilizing the apparatus 10 can be achieved by performing the following steps: lifting the safety door 40 upwardly through the safety door slot 46 to access the outlets 115; inserting a desired number of cords 105 from nearby electrical appliances and fixtures into the inner space of the enclosure 20 and connecting the plugs to the outlets 115; lowering the safety door 40 while routing the cords 105 through the cord slots 42 of the safety door 40; locking the safety door 40 in a lowered position using the key lock 44 and supplied key 50; and, benefiting from the improved safety and security of recessed electrical outlets 115 within the wall structure 100 afforded a user of the apparatus 10.

The foregoing embodiments of the disclosed electrical box with safety door have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments of the disclosed baluster bracket assembly shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. An electrical box comprising:
    an enclosure having sidewalls forming a front opening, said sidewalls being configured to mount at least one electrical outlet;
    a front frame extending perpendicularly outward from a perimeter edge of said sidewalls;
    a plurality of frame clamps mechanically connected to said front frame and configured to secure said enclosure to a wall surface; and,
    a door slidably connected to said enclosure behind said front frame, said door being movable between an open and a closed position to cover said front opening;
    wherein said door comprises at least one cord slot disposed therethrough and being configured to permit a power cord to extend through when said door is in said closed position.

2. The electrical box of claim 1, wherein said sidewalls comprise at least one knock-out section defined by a plurality of intersecting perforations; wherein said at least one knock-out section is removable about said perforations to form an opening, said opening configured to receive at least one electrical outlet.

3. The electrical box of claim 1, wherein said sidewalls comprise at least one generally rectangular opening configured to receive said at least one electrical outlet.

4. The electrical box of claim 1, wherein said enclosure further comprises a plurality of mounting apertures, each mounting aperture configured to receive a fastener to secure said enclosure to a support structure.

5. The electrical box of claim 1, wherein said enclosure further comprises a rectangular perimeter shape.

6. The electrical box of claim 1, wherein at least one of said plurality of frame clamps is disposed at each corner of said front frame.

7. The electrical box of claim 1, wherein each of said plurality of frame clamps comprises a tab threadably attached to said front frame by a threaded fastener; wherein rotation of said threaded fastener extends and retracts said tab relative to said front frame.

8. The electrical box of claim 1, wherein said door comprises a locking mechanism operably connectable to said enclosure to lock said door in said closed position.

9. The electrical box of claim 8, wherein said locking mechanism comprises a key actuated lock and a latch extending from said lock, said latch being movable between an engaged and a disengaged position.

10. An electrical box comprising:
    an enclosure configured to be recessed within an opening in a wall surface and having a rear wall, an upper wall, a lower wall, and lateral sidewalls forming a front opening, said rear wall and said sidewalls being configured to mount a plurality of electrical outlets;

a front frame extending perpendicularly outward from a perimeter edge of said sidewalls to contact an exterior of said wall surface;

a door slot disposed through said upper wall;

a plurality of frame clamps configured to secure said enclosure to an edge of said opening in said wall surface, wherein one of said plurality of frame clamps is mechanically connected to each corner of said front frame; and, a door extending between said sidewalls and slidably connected within said door slot, said door being movable between an open and a closed position to cover said front opening.

11. The electrical box of claim 10, wherein said door comprises at least one cord slot disposed about a lower edge and being configured to permit a power cord to extend through when said door is in said closed position.

12. The electrical box of claim 10, wherein said sidewalls and said rear wall each comprises a knock-out section defined by a plurality of intersecting perforations; wherein said knock-out sections are removable about said perforations to form openings, said openings configured to receive one of said plurality of electrical outlets.

13. The electrical box of claim 10, wherein said sidewalls and said rear wall each comprises a generally rectangular opening configured to receive one of said plurality of electrical outlets.

14. The electrical box of claim 11, wherein said enclosure further comprises a plurality of mounting apertures, each mounting aperture configured to receive a fastener to secure said enclosure to a support structure behind said wall surface.

15. The electrical box of claim 10, wherein each of said plurality of frame clamps comprises a tab spaced away from said front frame and threadably attached by a threaded fastener; wherein rotation of said threaded fastener extends and retracts said tab relative to said front frame.

16. The electrical box of claim 15, wherein said tab comprises a first end threadably attached to said threaded fastener, a second end opposite said first end, and a flat surface extending from said first end to said second end to contact an interior of said wall surface.

17. The electrical box of claim 10, wherein said door comprises a locking mechanism having a key actuated lock and a latch extending from said lock, said latch being movable between an engaged position to lock said door in said closed position and a disengaged position.

18. The electrical box of claim 17, wherein said lower wall comprises a latch aperture to operatively receive said latch in said engaged position.

19. The electrical box of claim 18, wherein said latch comprises a hook shape.

* * * * *